July 11, 1967 H. WEISS ETAL 3,331,045
GALVANO-MAGNETIC SEMICONDUCTOR FIELD PLATE
Filed Sept. 10, 1965 2 Sheets-Sheet 1

3,331,045
Patented July 11, 1967

3,331,045

GALVANO-MAGNETIC SEMICONDUCTOR FIELD PLATE

Herbert Weiss, Nurnberg, and Paul Hini, Erlangen, Germany, assignors to Siemens-Schuckertwerke Aktiengesellschaft, Berlin and Erlangen, Germany, a German corporation Filed Sept. 10, 1965, Ser. No. 486,289
Claims priority, application Germany, Sept. 11, 1964, S 93,104
4 Claims. (Cl. 338—32)

Figure 1:
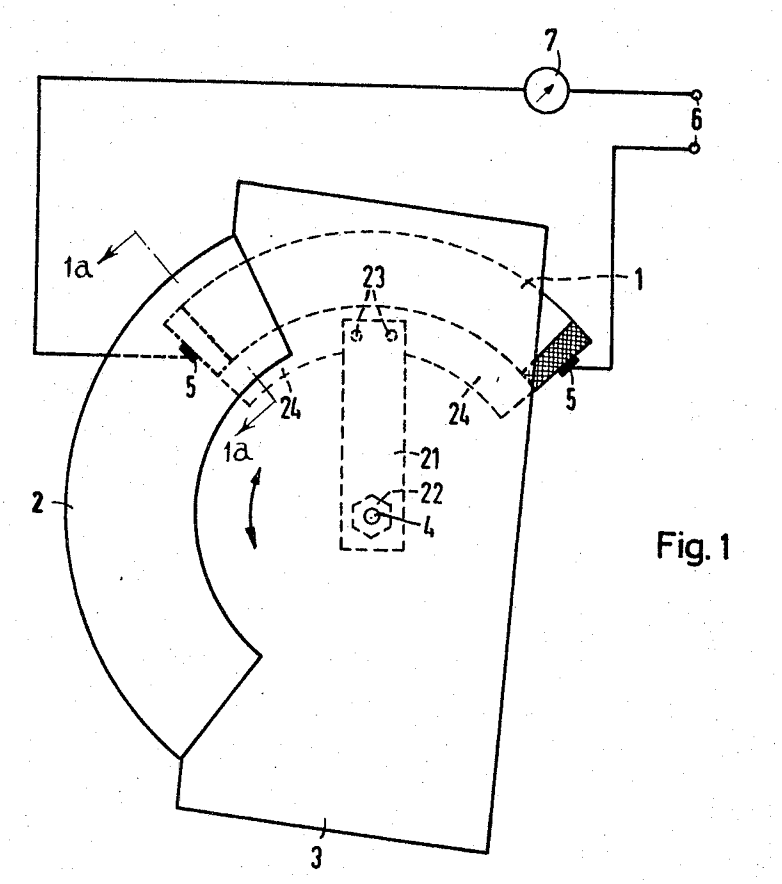

Our invention relates to galvano-magnetic semiconductor resistors. More particularly, it relates to novel galvano-magnetic semiconductor resistors having improved galvano-magnetic response characteristics.

It is, at present, known to dispose galvano-magnetic semiconductor resistors between the pole shoes of permanent magnets. Such disposition is made whereby the resistors are movable relative to the permanent magnets so that there are provided contact-free variable resistors or potentiometers. The electrical resistance of such a galvano-magnetic resistor attains a maximum when it is located completely within the magnetic field of a magnet and may be progressively reduced to a minimum in a continuous manner by correspondingly smoothly progressively removing the resistor from the air gap between the pole shoes of the magnet. Because of the enabling of such simplified manipulation, the magnet and the galvano-magnetic semiconductor resistor may be arranged to be rotatable with respect to each other about a mutual axis of rotation. Since such rotary arrangement has to be accommodated in the minimum possible space, it is appropriate to construct the resistor and the pole shoes of the magnet in an arcuate configuration, for example, ring sectors which fit into each other and are rotatable around a geometrically mutual axis of rotation.

It has been proposed to make galvano-magnetic semiconductor field plates having incorporated therein parallel aligned bodies which are relatively good conductors as compared to the semiconductor, such bodies constituting anisotropic portions in the semiconductor. It has been suggested that these anisotropic devices be utilized as non-contact variable resistors or potentiometers. The bodies which impart the anisotropic properties may suitably comprise short circuit strips which are alloyed on or into the semiconductor material in parallel alignment or they may be parallel aligned bodies incorporated into the semiconductor, the bodies suitably having the configuration of needles, pins, rods, or strips, etc.

It has been found that galvano-magnetic resistors in which the semiconductor comprises an inhomogeneous material, i.e., those having anisotropies, exhibit a much greater galvano-magnetic response than those comprising a homogeneous semiconductor material. The variation in the resistance of the described inhomogeneous semiconductor galvano-magnetic resistors, as determined by the intensity of the magnetic field in the magnetic circuit, is at a maximum when the directions of the anisotropies, the active magnetic field and the current flowing through the resistors, are respectively perpendicular to each other. However, such condition of mutual perpendicularly of the three directions occurs for only one physical disposition when arcuate galvano-magnetic resistors having parallel aligned anisotropic portions in their semiconductor layers are employed in a rotary resistor or potentiometer arrangement as described hereinabove. Consequently, the resistance of an arcuately shaped galvano-magnetic resistor comprising the described inhomogeneous semiconductor material does not vary linearly with the angle of rotation in the rotary arrangement. Because of this deficiency in the aforesaid rotary arrangement, heretofore, it has been difficult to provide practicable rotary resistors, potentiometers, etc., using galvano-magnetic resistors comprising an anisotropic semiconductor material which has a strong galvano-magnetic response.

Accordingly, it is an important object of this invention to provide a galvano-magnetic field plate comprising an anisotropic semiconductor material which may efficaciously be employed in a rotary resistor arrangement.

This object is attained by providing a galvano-magnetic semiconductor field plate having anisotropic sections therein which are aligned in parallel with the surface of the plate, the anisotropies being provided by bodies which have good electric conductivity as compared to the conductivity of the semiconductor material. The field plate is suitably chosen to have the configuration of a flat ring sector and the disposition of the anisotropic portions therein are so chosen whereby the current path through the semiconductor material is largely perpendicular to them. An embodiment of such field plate may suitably comprise one surface which consists entirely of a semiconductor material, the bodies which impart anisotropic properties being short circuit strips comprising a good conductivity material and which are radially disposed relative to the configuration of the ring sector configuration of the plate and which are applied on to the semiconductor material.

In another embodiment, the semiconductor galvano-magnetic field plate may be constructed in accordance with the principles of the invention in the following manner: A continuous planar strip of semiconductor material comprising a series of reciprocally occurring right angular U-shaped sections is applied to a flat ring sector which comprises an electrical insulating material. The semiconductor material comprising the strip includes bodies characterized by good electrical conductivity and which are disposed in spaced parallel relationship. The configurations of the U-shaped sections in the strip are so chosen that the parallel arms of the sections are longer than the bases connecting the arms, the good conductivity bodies being aligned in the semiconductor material perpendicularly with respect to the longitudinal axis of the aforesaid arms.

In the operation of the galvano-magnetic field plate constructed in accordance with the principles of the invention, it may suitably be inserted into the air gap between the pole shoes of a magnet in which such pole shoes are constructed in the configuration of flat ring sectors. The ring sector-shaped galvano-magnetic field plate and pole shoes may thereby be arranged relative to each other about a common geometric axis, i.e., the axis of the ring sectors.

Generally speaking and in accordance with the invention, there is provided a galvano-magnetic semiconductor field plate comprising a ring-sector shaped plate comprising a semiconductor material, an array of anisotropic bodies in the semiconductor material, the bodies comprising a material having good electrical conductivity relative to the electrical conductivity of the semiconductor material and being disposed whereby an electrical current flow path along the circumferential length of the plate is perpendicular to the disposition of the bodies.

The foregoing and more specific objects and features of our invention will be apparent from and will be mentioned in the following description of a galvano-magnetic semiconductor field plate according to the invention taken together with the accompanying drawing.

Figure 2:
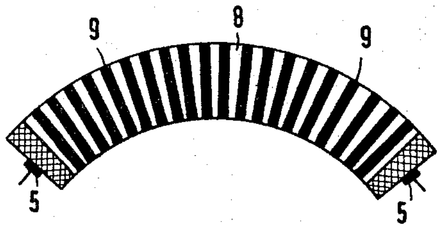
Figure 1A:
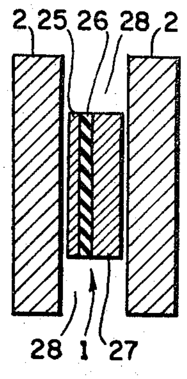
Figure 3:
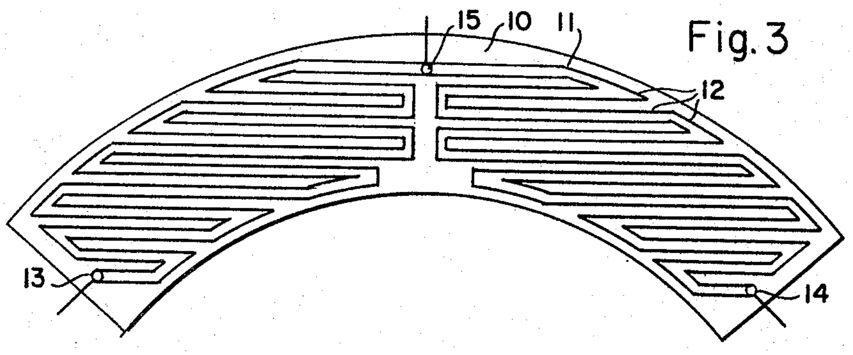
Figure 4:
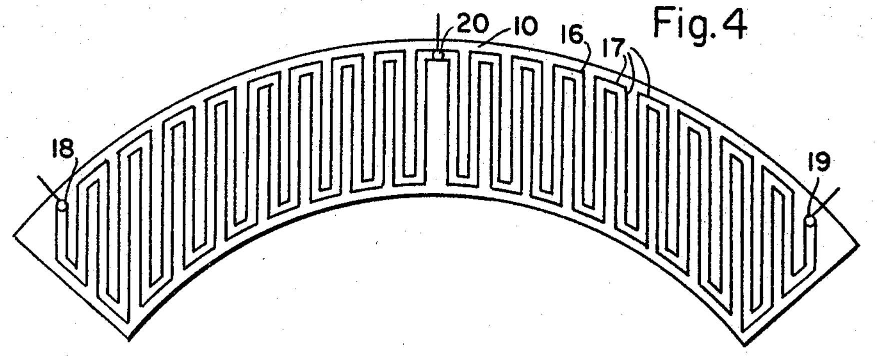

In the drawing, FIG. 1 is a schematic depiction of an arrangement of a galvano-magnetic semiconductor field plate and a magnet;

FIG. 1*a* is a cross section taken along lines 1*a*—1*a* of FIG. 1 looking in the direction of the arrows;

FIG. 2 is a schematic depiction of an illustrative embodiment of a galvano-magnetic semiconductor field plate constructed in accordance with the principles of the invention; and FIGS. 3 and 4 are schematic depictions of other illustrative embodiments according to the invention.

FIG. 1 is a plan view in which there is schematically depicted the arrangement of a galvano-magnetic semiconductor field plate 1 and the overlapping pole shoes 2 of a magnet 3. Field plate 1 having terminal electrodes 5 thereon, is adapted to be rotatable in the air gap between pole shoes 2 relative to pole shoes 2. Such rotation is about an axis conceptually depicted, and designated by the numeral 4. Axis 4 is a geometrically common axis for the ring sector shaped pole shoes 2 and ring sector shaped field plate 1 and is disposed in a plane perpendicular to the plane of the drawing, i.e. perpendicular to the plane surface of field plate 1. The magnetic field provided by magnet 3 traverses field plate 1 wherever the latter is located in the air gap of pole shoes 2, i.e. perpendicularly to the plane surface of field plate 1. Current supplied from a source 6 flows in a path along the circumferential length of field plate 1. The current from source 6 may suitably be measured by a meter 7. If so desired, a resistor may be included in the electrical circuit in place of meter 7 or together therewith. In the simplest embodiment of the arrangement of FIG. 1, magnet 3 may suitably be of the permanent magnet type.

In the arrangement of FIG. 1, plate 1 may suitably be pivotally connected to magnet 3 at axis 4 by a member 21. A stop member 24 is provided which is affixed to plate 1 to which member 21 is attached, suitably by screws 23. Member 21 is pivotally attached to magnet 3 at axis 4 by a bolt 22.

In FIG. 1*a*, there are shown pole shoes 2 and plate 1 disposed in the air gap 28 therebetween. Plate 1 may suitably comprise a semiconductor layer 25, a buffer insulating layer 26 and a base plate 27.

FIG. 2 schematically shows a field plate 8 constructed in accordance with the principles of the invention. Plate 8 is ring sector shaped similar to plate 1 in the arrangement of FIG. 1 and has terminal electrodes 5 thereon on the respective ends thereof. Plate 8 may essentially comprise a semiconductor material such as indium antimonide or indium arsenide or a ring-sector shaped plate of an insulating material such as ceramic or synthetic material upon whose surface a semiconductor layer has been applied. The main body of plate 8 may, alternatively, comprise a ferromagnetic or a ferrite material having a semiconductor layer thereon. In such arrangement, the semiconductor layer has to be insulated from the ferro-magnetic or ferrite material such as by cementing or other suitable well known means.

Alloyed onto or into the semiconductor material of plate 8 is a circumferential respectively radially disposed array of bodies 9, bodies 9 comprising a material having good electrical conductivity relative to the electrical conductivity of the semiconductor material, such good conductivity material suitably being copper, silver or indium. Effectively, the array of good conductivity bodies 9 alloyed into or onto the semiconductor layer of plate 8 may suitably be designated as a short circuit raster. Since the bodies 9 comprising such short circuit raster are radially disposed relative to the ring-sector shape of field plate 8, the direction of the current flowing in a path along the circumferential length of plate 8 is at every point substantially perpendicular to the disposition of short circuit bodies or strips 9. The device of FIG. 2 may readily be included in an arrangement as shown in FIG. 1.

In FIGS. 3 and 4, there are shown illustrative embodiments of galvano-magnetic field plates constructed according to the invention wherein the included good conductivity strips are disposed in spaced parallel relationship and in a plane parallel to the plane of the surface of the field plate. In FIGS. 3 and 4, strips 11 and 16 respectively, which are continuous strips of semiconductor material are applied to a surface of a flat ring-sector shaped carrier structure 10, structure 10 suitably comprising an electrical insulating material or being coated with such material. As seen in FIGS. 3 and 4, strip 11 comprises two portions, each of the portions comprising a series of reciprocally occurring staggered U-shaped sections and strip 16 comprises an arcuate array of reciprocally occurring U-shaped sections. The good conductivity inclusions 12 and 17 in strips 11 and 16 respectively are in spaced parallel relationship with respect to each other and in respective planes parallel to the surfaces of plates 10, such inclusions suitably comprising needle or strip-shaped bodies of nickel antimonide which have good conductivity as compared with the conductivity of the semiconductor.

The U-shaped sections in strips 11 and 16 respectively comprise parallel arms, inclusions 12 and 17 being respectively disposed perpendicular to the longitudinal axes of these arms, the bases of the U-shaped sections being relatively short as compared to the lengths of the arms and connecting the arms at their ends. Consequently, in a predominant portion of a current path traversing plates 10, current flows perpendicularly to the direction of the disposition of inclusions 12 and 17. Thus, the active magnetic field as provided in an arrangement such as is depicted in FIG. 1, is everywhere perpendicularly directed toward the plane of the field plate.

In accordance with the invention, therefore, the requirements of mutual perpendicularity for producing the greatest possible effect of the magnetic field upon the resistance of the field plate are substantially met for all positions of a rotary arrangement as depicted in FIG. 1, viz., anisotropies, magnetic field and current except possibly for the negligibly short bases of the U-shaped sections of the semiconductor strips. The resistance of the field plate not only changes smoothly and continuously but also linearly with angle of rotation in arrangements where it is employed as a rotary resistor or a rotary potentiometer.

In the event that it is desired to use the field plate of the invention as a rotary potentiometer, then, in addition to two terminal contacts for the respective ends of the plates, there are further included third terminals respectively therein. Thus, for example, in the devices of FIGS. 3 and 4, in addition to end terminals 13 and 14, and 18 and 19 respectively, there are further included terminals 15 and 20. Thus, if terminals 18 and 19 of the device of FIG. 4 are connected across a fixed input voltage source, (not shown), then terminals 19–20 furnish a magnetically controllable tap voltage.

Suitable starting semiconductor materials for producing the semiconductor field plates in accordance with the invention are $A^{III}B^{V}$ materials of the elements of Groups III and V of the Periodic Table of Elements, indium antimonide or indium arsenide being particularly suited for this purpose. The inclusions 12 and 17 of the device of FIGS. 3 and 4 respectively may consist of good conductivity metals such as silver, copper, indium, etc., or of a second phase in the base semiconductor material which is of good conductivity and which tends to crystallize in needle or strip form, suitable examples of the semiconductor material-inclusion material combination being nickel antimonide in indium antimonide or gallium cobalt in gallium antimonide.

Semiconductor field plates, in accordance with those shown in FIGS. 3 and 4, may also be produced by applying a layer of semiconductor material having parallel aligned spaced inclusions therein onto a ring-sector shaped foundation plate 10 comprising an insulating material such as a synthetic material or ceramic, for example, and by thereafter etching the desired shape of the strip (reciprocally occurring U-shaped sections), suitably by the photo resistance technique. If the foundation or base plate 10 is chosen to comprise a ferromagnetic or ferrite material, plate 10 has to be first coated with an electrical insulating layer before the semiconductor layer is applied thereto.

It will be obvious to those skilled in the art upon studying this disclosure that galvano-magnetic field plates according to our invention permit of a great variety of modifications and hence can be given embodiments other than those particularly illustrated and described herein without departing from the essential features of our invention and within the scope of the claims annexed hereto.

We claim:

1. A galvano-magnetic semiconductor field plate of flat ring-sector shaped configuration comprising semiconductor material having a surface of substantially planar configuration and an array of spaced anisotropic bodies of good electrical conductivity relative to the electrical conductivity of said semiconductor material, said anisotropic bodies being positioned on the surface of said field plate parallel to the plane of said surface and substantially perpendicular to at least the principal portion of a current flow path along the circumferential length of said field plate.

2. A galvano-magnetic semiconductor field plate as defined in claim 1, wherein said anisotropic bodies are radially positioned in said semiconductor material in a circumferential array.

3. A galvano-magnetic semiconductor field plate as defined in claim 1, further comprising a layer of electrically insulating material, and wherein said semiconductor material is in the form of a continuous strip layer positioned on said layer of insulating material, said strip including straight segments substantially parallel to each other and longer than the remaining segments of said strip, said strip comprising a series of reciprocally occurring U-shaped substantially rectangular sections, each of said sections comprising a pair of parallel spaced arm segments and a base segment connecting said arms, said arm segments being longer than said base segment, each of said arm segments having a longitudinal axis, and wherein said anisotropic bodies are positioned in said strip in spaced parallel relationship and perpendicular to the longitudinal axes of said arm segments.

4. A galvano-magnetic semiconductor field plate as defined in claim 1, further comprising a magnet having pole shoes having the configuration of flat ring sectors and having an air gap for receiving said field plate, said pole shoes and said field plate being arranged whereby they have a common geometric axis of rotation, said field plate being positioned in the air gap of said magnet.

References Cited

UNITED STATES PATENTS

| | | | |
|---|---|---|---|
| 2,846,553 | 8/1958 | Black | 338—68 |
| 2,894,234 | 7/1959 | Weiss et al. | 338—32 |
| 3,112,464 | 11/1963 | Ratajski et al. | 338—32 |
| 3,162,804 | 11/1964 | Parsons | 323—94 |
| 3,267,405 | 8/1965 | Weiss et al. | 338—32 |

RICHARD M. WOOD, *Primary Examiner.*

W. D. BROOKS, *Assistant Examiner.*